US010859019B2

(12) United States Patent
Fei et al.

(10) Patent No.: US 10,859,019 B2
(45) Date of Patent: Dec. 8, 2020

(54) STARTING A GASEOUS AND PILOT FUELED ENGINE

(71) Applicant: WESTPORT POWER INC., Vancouver (CA)

(72) Inventors: Wei Fei, Burnaby (CA); James D Walker, Malvern (GB)

(73) Assignee: WESTPORT POWER INC., Vancouver (CA)

( * ) Notice: Subject to any disclaimer, the term of this patent is extended or adjusted under 35 U.S.C. 154(b) by 374 days.

(21) Appl. No.: 15/118,423

(22) PCT Filed: Feb. 10, 2015

(86) PCT No.: PCT/CA2015/050097
§ 371 (c)(1),
(2) Date: Aug. 11, 2016

(87) PCT Pub. No.: WO2015/120549
PCT Pub. Date: Aug. 20, 2015

(65) Prior Publication Data
US 2017/0175657 A1   Jun. 22, 2017

(30) Foreign Application Priority Data

Feb. 11, 2014   (CA) ..................................... 2842729

(51) Int. Cl.
*F02D 41/06* (2006.01)
*F02D 19/10* (2006.01)
(Continued)

(52) U.S. Cl.
CPC ....... *F02D 41/064* (2013.01); *F02D 19/0628* (2013.01); *F02D 19/10* (2013.01);
(Continued)

(58) Field of Classification Search
CPC .... F02D 41/064; F02D 19/10; F02D 41/0027; F02D 2200/0414; F02D 2200/0602;
(Continued)

(56) References Cited

U.S. PATENT DOCUMENTS 3,991,558 A    11/1976  Schroff
4,136,657 A *  1/1979   Tanaka ................. F02M 63/022
                                                123/179.21
(Continued)

FOREIGN PATENT DOCUMENTS

CN        1465851 A      1/2004
CN        101571069 A    11/2009

OTHER PUBLICATIONS

Extended European Search Report, dated Oct. 23, 2017 , for European Application No. 15749079.8-1603 / 3105442, 8 pages.
(Continued)

*Primary Examiner* — Sizo B Vilakazi
(74) *Attorney, Agent, or Firm* — Seed IP Law Group LLP

(57) ABSTRACT

Starting a gaseous fuelled engine employing a pilot fuel at cold temperatures is challenging due to reduced ignitability and combustion efficiency of the fuel(s), and the increased viscosity of engine oil. A technique for starting a compression ignition, gaseous fuelled internal combustion engine employing a pilot fuel comprises determining one of a normal start condition and a cold start condition; during the normal start condition, introducing the pilot fuel into a combustion chamber of the internal combustion engine when the pilot fuel pressure rises above a first pressure; during the cold start condition, introducing the pilot fuel into the combustion chamber when the pilot fuel pressure rises above a second pressure that is higher than the first pressure; and selectively introducing the gaseous fuel into the combustion chamber.

24 Claims, 5 Drawing Sheets

FIG. 1

(51) Int. Cl.
*F02D 41/00* (2006.01)
*F02D 19/06* (2006.01)

(52) U.S. Cl.
CPC ..... *F02D 41/0025* (2013.01); *F02D 41/0027* (2013.01); *F02D 19/0681* (2013.01); *F02D 19/0689* (2013.01); *F02D 19/0694* (2013.01); *F02D 19/105* (2013.01); *F02D 2200/0414* (2013.01); *F02D 2200/0602* (2013.01); *Y02T 10/30* (2013.01)

(58) Field of Classification Search
CPC .... F02D 41/403; F02D 41/068; F02D 41/086; F02D 14/062; F02D 41/065; F02D 2013/0292; F02D 2001/167; F02D 41/0025; F02D 19/0628; F02D 19/0694; F02D 19/105; F02D 19/0681; F02D 19/0689; Y02T 10/36
See application file for complete search history.

(56) References Cited

U.S. PATENT DOCUMENTS

| | | | | |
|---|---|---|---|---|
| 4,565,170 | A * | 1/1986 | Grieshaber | F02D 41/042 123/198 DB |
| 4,576,137 | A * | 3/1986 | Tanaka | F02D 19/105 123/276 |
| 4,841,936 | A * | 6/1989 | Takahashi | F02D 41/2096 123/447 |
| 5,097,803 | A * | 3/1992 | Galvin | F02D 19/0647 123/1 A |
| 5,313,924 | A * | 5/1994 | Regueiro | F02D 41/3836 123/446 |
| 5,501,185 | A | 3/1996 | King et al. | |
| 5,517,972 | A * | 5/1996 | Stockner | F02B 75/22 123/496 |
| 5,566,653 | A | 10/1996 | Feuling | |
| 7,234,440 | B2 | 6/2007 | Hilditch | |
| 7,336,002 | B2 * | 2/2008 | Kato | F02N 11/0866 307/10.6 |
| 7,370,629 | B2 | 5/2008 | Kohler et al. | |
| 7,546,834 | B1 | 6/2009 | Ulrey et al. | |
| 7,624,720 | B1 * | 12/2009 | Dokas | F02M 63/0052 123/457 |
| 8,028,676 | B2 | 10/2011 | Ancimer et al. | |
| 9,605,641 | B2 * | 3/2017 | Courtiel | F02N 11/0848 |
| 2003/0034013 | A1 * | 2/2003 | Sato | F02D 41/0087 123/491 |
| 2003/0037771 | A1 * | 2/2003 | Yuya | F02D 41/009 123/491 |
| 2004/0094126 | A1 * | 5/2004 | Hasegawa | F02D 41/3845 123/447 |
| 2004/0107941 | A1 * | 6/2004 | Goto | F02B 19/1085 123/275 |
| 2004/0182367 | A1 * | 9/2004 | Denz | B60K 28/04 123/447 |
| 2005/0161017 | A1 * | 7/2005 | Warlick | F02D 19/0631 123/275 |
| 2006/0054137 | A1 * | 3/2006 | Tokuda | F02D 41/061 123/431 |
| 2007/0012283 | A1 * | 1/2007 | Rockwell | F02D 41/064 123/299 |
| 2009/0151697 | A1 * | 6/2009 | Hatano | F02D 41/403 123/435 |
| 2010/0294236 | A1 * | 11/2010 | Surnilla | F02D 41/0025 123/304 |
| 2011/0000463 | A1 * | 1/2011 | Kokotovic | F02D 41/042 123/457 |
| 2011/0088655 | A1 * | 4/2011 | Ancimer | F02D 41/0027 123/299 |
| 2011/0239993 | A1 * | 10/2011 | Powell | F02M 37/106 123/497 |
| 2012/0266843 | A1 * | 10/2012 | Yoshioka | F02M 43/04 123/304 |
| 2012/0318237 | A1 | 12/2012 | Tsukagoshi et al. | |
| 2013/0275029 | A1 | 10/2013 | Schwarz et al. | |
| 2013/0276756 | A1 * | 10/2013 | Leone | F02D 41/064 123/445 |
| 2013/0306029 | A1 * | 11/2013 | Stockner | F02M 21/0275 123/445 |
| 2014/0121944 | A1 * | 5/2014 | Douglas | F02D 41/064 701/103 |
| 2014/0196685 | A1 * | 7/2014 | Ruhland | F02B 17/005 123/295 |
| 2014/0305406 | A1 * | 10/2014 | Pursifull | F02M 21/0239 123/434 |
| 2015/0128907 | A1 * | 5/2015 | Redon | F02B 75/12 123/46 R |
| 2015/0369157 | A1 * | 12/2015 | Lehmen | F02D 41/064 701/105 |

OTHER PUBLICATIONS

International Search Report and Written Opinion of the International Searching Authority, dated Mar. 9, 2015, for International Application No. PCT/CA2015/050097, 10 pages.
Office Action, dated Aug. 8, 2014, for corresponding Canadian Application No. 2,842,729, 3 pages.
Chinese Office Action, dated Nov. 27, 2018, for Chinese Application No. 2015800077059, 8 pages. (w/ English Machine Translation).

* cited by examiner

STARTING A GASEOUS AND PILOT FUELED ENGINE

FIELD OF THE INVENTION

The present application relates to a technique of starting an internal combustion engine fuelled with a gaseous fuel and a pilot fuel, and more particularly to cold starting the engine.

BACKGROUND OF THE INVENTION

The ignitability of fuel and combustion efficiency are reduced when cold starting an internal combustion engine. Within the context of this disclosure, cold starting is defined as starting an engine in a cold environment, for example when the ambient air temperature is below a predetermined value such that the fuel will not ignite under the normal starting procedure. For an engine operating in the Diesel-cycle, the temperature and pressure developed in a combustion chamber near the end of the compression stroke provide conditions suitable for the auto-ignition of fuel. When the ambient air temperature is lowered, the temperature achievable at the end of the compression stroke is reduced, and consequently the ignitability and combustion efficiency of that fuel inside the combustion chamber is reduced. As the ambient air temperature is further lowered, eventually the combustion chamber temperature will fall below the auto-ignition temperature of the fuel at the pressure inside the combustion chamber and the fuel will not ignite.

It is known to use a pilot fuel, such as diesel, to ignite a gaseous fuel in diesel-cycle internal combustion engines. The auto-ignition temperature for typical gaseous fuels, such as natural gas, is too high for compression ignition to reliably occur in internal combustion engines employing conventional compression ratios. For this reason a small amount of diesel fuel is introduced later in the compression stroke that ignites by compression ignition and combustion of the diesel fuel triggers ignition of the gaseous fuel therein.

In cold start conditions, diesel transfer pump heaters are employed to heat diesel fuel above the gel point temperature when pumping from a storage tank. It is also known to employ electric block heaters to heat engine oil and engine coolant. However, some jurisdictions do not have the necessary infrastructure to support ubiquitous use of electric block heaters. As an alternative, in extremely cold environments warm rooms where the temperature is maintained above ambient air temperature, although characteristically still well below zero degrees centigrade, are employed to house one or more vehicles. Diesel fuelled coolant heater pump systems are also employed to pump warm water through the coolant circuit to warm the engine.

For engines that are fuelled with a gaseous fuel and another fuel it is known to increase the amount of gaseous fuel employed when cold starting the engine. Generally, emissions are reduced when fuelling with gaseous fuels. U.S. Pat. No. 7,546,834 issued to Ulrey et al. on June 16, 2009 discloses a multi-fuel engine that is fuelled with a gaseous fuel and/or a liquid fuel, and when the multi-fuel engine is cold started (non-warmed) it is preferred that the gaseous fuel is used to reduce starting emissions before an emission control device has reached its operating temperature. In situations where combustion efficiency is reduced, such as cold starting, reducing emissions is desirable. During extremely cold starting temperatures, starting with either a gaseous fuel or other fuel is challenging due to reduced ignitability and combustion efficiency.

The state of the art is lacking in techniques for cold starting internal combustion engines fuelled with a gaseous fuel and a pilot fuel. The present method and apparatus provide a technique for cold starting such internal combustion engines.

SUMMARY OF THE INVENTION

An improved method for starting a compression ignition, gaseous fuelled internal combustion engine employing a pilot fuel comprises determining one of a normal start condition and a cold start condition; during the normal start condition, introducing the pilot fuel into a combustion chamber of the internal combustion engine when the pilot fuel pressure rises above a first pressure; during the cold start condition, introducing the pilot fuel into the combustion chamber when the pilot fuel pressure rises above a second pressure that is higher than the first pressure; and selectively introducing the gaseous fuel into the combustion chamber. The second pressure is greater than the first pressure to prevent pilot fuel pressure from dropping below injection pressure while injecting pilot fuel during cold start. It is more challenging to maintain a suitable pilot fuel injection pressure during cold start since the pump that pressurizes pilot fuel is turning slower compared to normal start causing it to take more time to pressurize pilot fuel. In addition, more pilot fuel is introduced during cold start compared to normal start. Pilot fuel can be pressurized by a pump mechanically driven by a power take-off of the engine. Alternatively, pilot fuel can be pressurized by an electrically driven pump, such that the engine can be cranked after the pilot fuel has pressurized. Cold start conditions exist when at least one of ambient air temperature, air intake temperature, battery temperature, controller temperature, engine coolant temperature, engine oil temperature, gaseous fuel temperature and pilot fuel temperature is below a respective temperature threshold. The second pressure can be determined as a function of the respective temperature threshold. The timing for the first pilot fuel injection can alternatively be determined by determining when a rate of pilot fuel pressure increase rises above a predetermined value; and waiting a predetermined amount of time after said rate of pilot fuel pressure increases above said predetermined value before introducing the pilot fuel such that the pilot fuel rises above the second pressure. The controller temperature can be monitored to determine whether the engine was recently running. A first cold start calibration can be employed when the one of controller temperature and battery temperature is greater than the ambient air temperature by a predetermined margin, and a second cold start calibration can be employed when one of the controller temperature and battery temperature is less than a sum of the ambient air temperature and the predetermined margin. The gaseous fuel is at least one of biogas, dimethyl ether, ethane, hydrogen, landfill gas, liquefied natural gas, liquefied propane gas, methane, natural gas and propane. The pilot fuel is any compression ignitable fuel, and an exemplary pilot fuel is diesel.

In a preferred embodiment, start of injection timing can be advanced when the cold start condition exists compared to start of injection timing during the normal start condition. Start of injection timing can be determined as a function of at least one of ambient air temperature, air intake temperature, battery temperature, controller temperature, engine coolant temperature, engine oil temperature, gaseous fuel temperature and pilot fuel temperature. Alternatively, or additionally start of injection timing can be determined as a function of pilot fuel injection quantity.

In a preferred embodiment, pilot fuel injection quantity can be increased when the cold start condition exists compared to pilot fuel injection quantity during the normal start condition. Pilot fuel injection quantity can be determined as a function of at least one of ambient air temperature, air intake temperature, battery temperature, controller temperature, engine coolant temperature, engine oil temperature, gaseous fuel temperature and pilot fuel temperature.

An improved internal combustion engine fuelled with a gaseous fuel and a pilot fuel comprises a gaseous fuel supply and a pilot fuel supply. A pumping apparatus pressurizes pilot fuel received from the pilot fuel supply. A fuel injector is in fluid communication with the pumping apparatus and is configured to directly introduce pilot fuel into a combustion chamber of the internal combustion engine. A controller is operatively connected with the pumping apparatus and the fuel injector and is programmed to command the pumping apparatus to pressurize the pilot fuel when starting the internal combustion engine; determine one of a normal start condition and a cold start condition; during the normal start condition, command the fuel injector to introduce the pilot fuel into the combustion chamber when the pilot fuel pressure rises above a first pressure; and during the cold start condition, command the fuel injector to introduce the pilot fuel into the combustion chamber when the pilot fuel pressure rises above a second pressure that is higher than the first pressure. The second pressure is greater than the first pressure to prevent pilot fuel pressure from dropping below injection pressure while injecting pilot fuel during cold start. The controller can be programmed to command a starter motor to crank the internal combustion engine such that the pumping apparatus pressurizes the pilot fuel as a result of the cranking Alternatively, the controller can be programmed to command the starter motor to crank the internal combustion engine after the pilot fuel pressure rises above (a) the first pressure during the normal start condition and (b) the second pressure during the cold start condition.

The fuel injector can be in fluid communication with the gaseous fuel supply and configured to directly introduce gaseous fuel into the combustion chamber. The controller is programmed to selectively command the fuel injector to introduce the gaseous fuel. Alternatively, there can be a gaseous fuel injector in fluid communication with the gaseous fuel supply and configured to directly introduce gaseous fuel into the combustion chamber. The controller can be further programmed to selectively command the gaseous fuel injector to introduce the pilot fuel. A shut-off valve downstream of the gaseous fuel supply can be commanded by the controller to fluidly disconnect the gaseous fuel supply from the combustion chamber during the cold start condition. In a preferred embodiment a pressure regulating apparatus supplies the fuel injector or the gaseous fuel injector with gaseous fuel. The pressure regulating apparatus is in fluid communication with the gaseous fuel supply for regulating gaseous fuel pressure based on pilot fuel pressure.

DETAILED DESCRIPTION OF PREFERRED EMBODIMENT(S)

Figure 1:
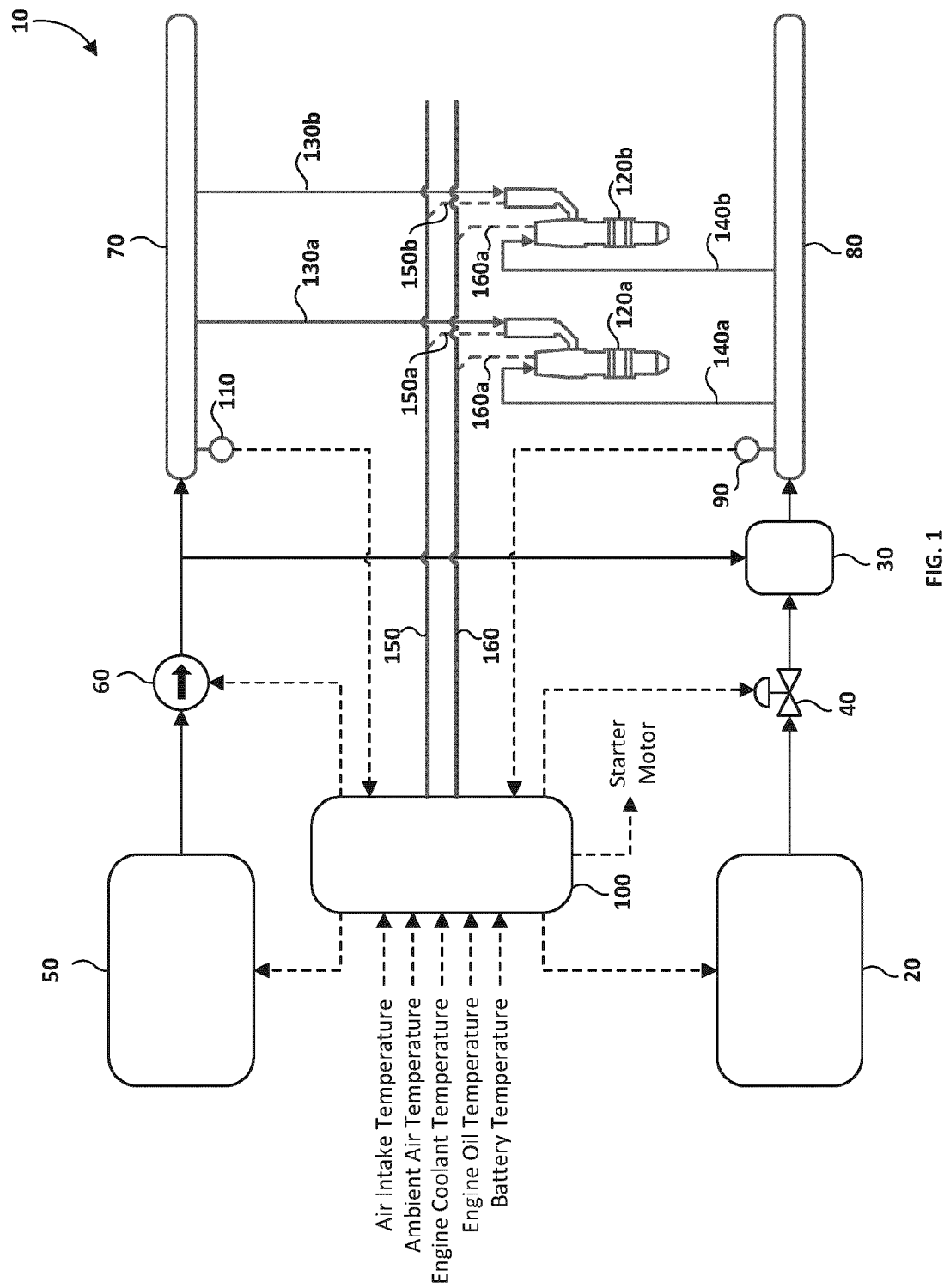
FIG. 1 is a schematic view of an internal combustion engine fuelled with a gaseous fuel and a pilot fuel according to a first embodiment.

Referring to FIG. 1, there is shown fuel system 10 for a compression ignition internal combustion engine fuelled with a gaseous fuel and a pilot fuel. Only the components relevant for the understanding of the present technique are shown, as would be known by those skilled in the technology there are other components associated with a fuel system that are not illustrated. Controller 100 sends command signals to operate components in fuel system 10 and receives status signals from components to monitor various operating parameters of the fuel system, as will be described in more detail below. Dotted lines in the figures represent electrical wire(s) carrying command signals from controller 100, and/or status signals to the controller. An arrow at the end of a dotted line connected to a component indicates that the electrical wire(s) carries a command signal(s), and an arrow at the end of a dotted line connected to controller 100 indicates that the electrical wire(s) carries a status signal(s) received by controller 100. Controller 100 can comprise both hardware and software components. The hardware components can comprise digital and/or analog electronic components. In the embodiments herein controller 100 comprises a processor and memories, including one or more permanent memories, such as FLASH, EEPROM and a hard disk, and a temporary memory, such as SRAM and DRAM, for storing and executing a program. In other embodiments controller 100 can comprise a base engine electronic control unit and a secondary electronic control unit interconnected with a controller area network (CAN) bus, or other conventional bus that can exchange information between the control units. As used herein, the terms algorithm and step refer to an application specific integrated circuit (ASIC), an electronic circuit, a processor (shared, dedicated, or group) and memory that execute one or more software or firmware programs, a combinational logic circuit, and/or other suitable components that provide the described functionality. The algorithms and steps that are performed by controller 100 are part of the controller.

Pilot fuel supply apparatus 50 supplies pressurized pilot fuel to pumping apparatus 60 that pressurizes the pilot fuel to a higher pressure. In a preferred embodiment, when the pilot fuel is a liquid fuel such as diesel, pilot fuel supply apparatus 50 can comprise a liquid storage tank and a transfer pump (both not shown). Pumping apparatus 60 can comprise an inlet metering valve and common rail pump (both not shown). The common rail pump can be mechanically driven by a power-take-off (PTO) of the engine, or can be electrically driven. When the common rail pump is driven by the PTO, controller 100 at least commands pumping apparatus 60 to pressurize fuel. Alternatively, pumping apparatus 60 can comprise a unit injector employing an electrically controlled mechanical pump. Pumping apparatus 60 is commanded by controller 100 to supply pressurized pilot fuel to pilot fuel rail 70 and pressure regulating apparatus 30.

Gaseous fuel supply apparatus 20 supplies pressurized gaseous fuel to pressure regulating apparatus 30 through shut-off valve 40. In a preferred embodiment, when the gaseous fuel is a liquefied gaseous fuel, such as liquefied natural gas (LNG), gaseous fuel supply apparatus 20 can comprise a cryogenic storage vessel (not shown) for the LNG, a cryogenic pump (not shown) for pressurizing the LNG through a vaporizer (not shown). A gaseous fuel is any fuel that is in a gas state at standard temperature and pressure, which in the context of this disclosure is defined as 20° C. and 1 atmosphere (atm). Shut-off valve 40 can be commanded by controller 100 to cut-off gaseous fuel supply to pressure regulating apparatus 30, for example when the engine is only fuelling with pilot fuel. When the internal combustion engine is shutdown shut-off valve 40 is normally closed. In the illustrated embodiment pressure regulating apparatus 30 employs pilot fuel from pumping apparatus 60 to regulate the pressure of gaseous fuel from gaseous fuel supply apparatus 20. In other embodiments, the pressure regulating apparatus can employ gaseous fuel to regulate the pressure of the pilot fuel. In a preferred embodiment pressure regulating apparatus 30 comprises a dome loaded-type regulator. Pressure regulating apparatus 30 is employed to adjust and maintain a pressure differential between the pilot fuel and the gaseous fuel within a range of tolerance, and to supply gaseous fuel at such a pressure to gaseous fuel rail 80. In preferred embodiments, pilot fuel pressure is kept higher than gaseous fuel pressure and controlling the pressure differential prevents or reduces leakage of the pilot fuel into the gaseous fuel. In other embodiments pressure regulating apparatus 30 is not required and pilot fuel can be regulated by pumping apparatus 60 and gaseous fuel can be regulated by gaseous fuel supply apparatus 30 and controller 100 monitors the respective pressures of pilot fuel and gaseous fuel such that the pressure differential between the pilot fuel and gaseous fuel in rails 70 and 80 is maintained within the range of tolerance. However, pressure regulating apparatus 30 can provide improved transient response.

Gaseous fuel pressure in rail 80 is monitored by pressure sensor 90 that sends a signal to controller 100 representative of gaseous fuel pressure. Pilot fuel pressure in rail 70 is monitored by pressure sensor 110 that sends a signal to controller 100 representative of pilot fuel pressure. Gaseous and pilot fuel pressures and other engine operating parameters are employed by controller 100 to command gaseous fuel supply apparatus 20, liquid fuel supply apparatus 50 and pumping apparatus 60 to maintain gaseous fuel pressure in rail 80 at a predetermined value and pilot fuel pressure in rail 70 at a predetermined value, within respective ranges of tolerance. Pilot fuel in rail 70 is delivered to fuel injectors 120*a* and 120*b* through piping 130*a* and 130*b* respectively, and gaseous fuel in rail 80 is delivered to the fuel injectors through piping 140*a* and 140*b* respectively. In preferred embodiments, fuel injectors 120*a* and 120*b* are hydraulically actuated injectors that inject pilot fuel and gaseous fuel, which can be actuated to introduce pilot fuel separately and independently from gaseous fuel. In another preferred embodiment fuel injectors 120*a* and 120*b* comprise concentric needles for introducing pilot fuel and gaseous fuel that operate with a predetermined pressure differential between pilot fuel and gaseous fuel. While only two such fuel injectors 120*a* and 120*b* are illustrated in FIG. 1, it is understood that preferred embodiments comprise at least one fuel injector for injection of fuel directly into each associated engine combustion chamber. Control bus 150 from controller 100 comprises control lines 150*a* and 150*b* that actuate respective fuel injectors 120*a* and 120*b* to inject pilot fuel. Similarly, control bus 160 from controller 100 comprises control lines 160*a* and 160*b* that actuate respective fuel injectors 120*a* and 120*b* to inject gaseous fuel.

Controller 100 can receive signals from one or more temperature sensors (not shown) representative of air intake temperature, ambient air temperature, battery temperature, engine oil temperature, engine coolant temperature, gaseous fuel temperature, and pilot fuel temperature. One or more of these temperature sensors can be connected to the CAN bus, or alternatively can communicate with controller 100 over a digital interface or analog interface. These temperatures can be employed to determine whether a cold start condition exists, as will be explained in more detail below. Air intake temperature is generally correlated to ambient air temperature. Battery temperature is indicative of the ability of the battery to supply power to a starter motor and fuel injectors. Additionally, controller 100 can have an internal temperature sensor that provides a signal representative of controller temperature, which is typically associated with a different area of the engine than engine oil temperature and engine coolant temperature. When the engine is started after being shutdown for a predetermined amount of time, controller temperature is correlated to ambient air temperature and can be employed to estimate air intake temperature. When the engine is started before it has been in a shutdown state for the predetermined amount of time, controller temperature will normally be higher than ambient air temperature and can be employed to detect that the engine has been previously running. Controller temperature is representative of the temperature of fuel injector drivers. As the temperature of the fuel injector drivers decreases, the voltage applied to the fuel injectors drops resulting in reduced performance. The pulse widths applied to the fuel injectors may need to be increased such that a predetermined quantity of fuel is introduced into the engine by the fuel injectors.

Figure 2:
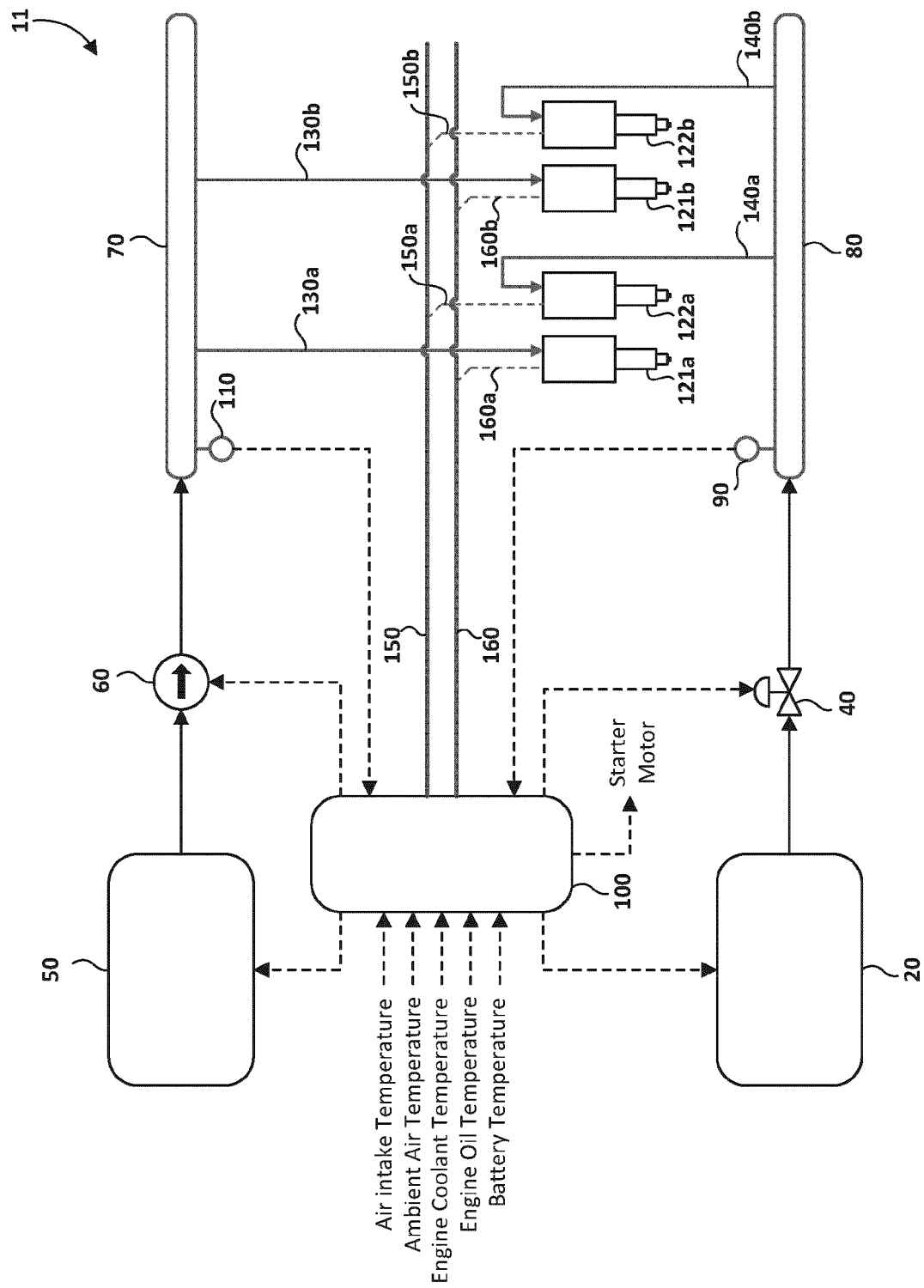
FIG. 2 is a schematic view of an internal combustion engine fuelled with a gaseous fuel and a pilot fuel according to a second embodiment.

Referring now to FIG. 2 fuel system 11 is shown according to a second embodiment that is similar to the first embodiment where like parts have like reference numerals and may not be described in detail if at all. Fuel injectors 121*a* and 121*b* are pilot fuel injectors that introduce only pilot fuel, and fuel injectors 122*a* and 122*b* are gaseous fuel injectors that introduce only gaseous fuel. Fuel injectors 121[*a-b*] and 122[*a-b*] do not require a predetermined pressure differential between pilot fuel and gaseous fuel to operate. Accordingly, gaseous fuel pressure in gaseous fuel rail 80 is controlled independently of pilot fuel pressure in pilot fuel rail 70. That is, pilot fuel pressure can increase and decrease without affecting gaseous fuel pressure and gaseous fuel pressure can increase and decrease without affecting pilot fuel pressure. In other embodiments one of each fuel injector 121 and 122 can be combined into a single housing.

Figure 3:
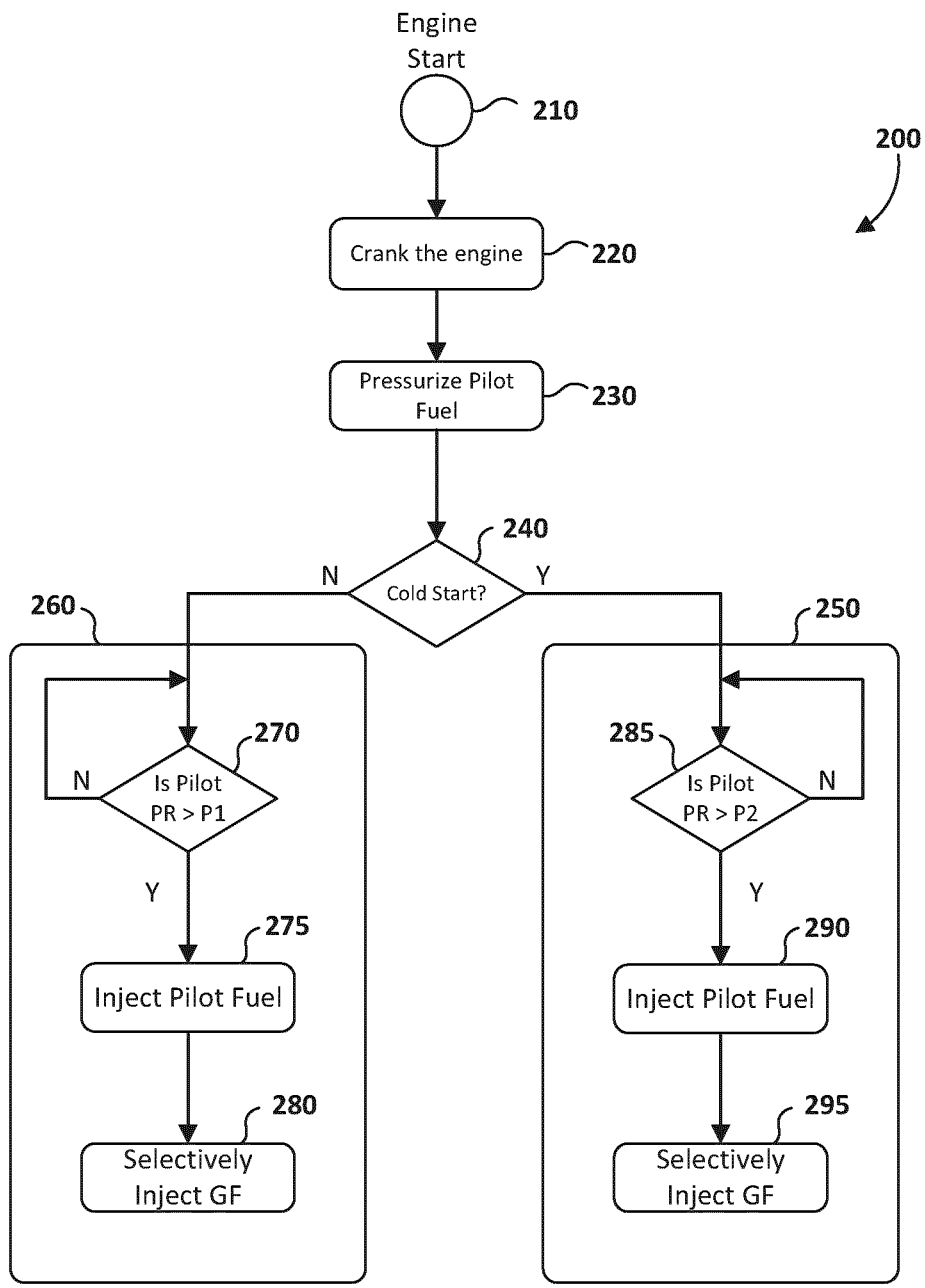
FIG. 3 is flow chart view of a start-up algorithm for the internal combustion engines of FIGS. 1 and 2 according to a first embodiment.

A technique of starting internal combustion engines employing the fuel systems illustrated in FIGS. 1 and 2 is now discussed. Referring to FIG. 3, there is shown start-up algorithm 200 that is programmed in and performed by controller 100 for starting engines where pumping apparatus 60 is driven directly or indirectly by a power take-off of the engine. The steps in algorithm 200 are presented in a serial manner; however it is possible that some of these steps can be performed in parallel. Algorithm 200 begins with an engine start command from a user in step 210. This can result from turning an ignition key, pushing an ignition button on a dashboard or a key fob, or the like. A starter motor (not shown) is commanded to crank the engine in step 220 causing the pistons to reciprocate and the power take-off to energize pumping apparatus 60. The starter motor can be actuated by an ignition circuit directly energized by the turning of the ignition switch (or the like). Alternatively, the starter motor can be actuated by controller 100 energizing the ignition circuit. When the starter motor is commanded by controller 100, the crank position can be detected before the starter motor is actuated such that more advanced knowledge is obtained to better determine when the first injection of fuel can occur. Pumping apparatus 60 is commanded in step 230 to pressurize pilot fuel, which can comprise adjusting the inlet metering valve to control outlet pressure of a pump in the pumping apparatus. Controller 100 determines whether cold start conditions exist in step 240, and if cold start conditions exist then a cold start algorithm is performed in step 250, and when cold start conditions do not exist then normal start conditions exist and a normal start algorithm is performed in step 260.

Cold start conditions can be determined in a variety of ways, and different criteria can be employed to make such a determination. For example, a temperature representative of air intake temperature can be employed to determine cold start conditions. Such a temperature can be ambient air temperature, controller temperature or actual air intake temperature. When the temperature representative of air intake temperature is below a first temperature threshold then cold start conditions exist, otherwise they do not. The temperature of the charge in the combustion chamber at the end of the compression stroke decreases as the air intake temperature decreases. As a result less heat is available to ignite the pilot fuel reducing combustion efficiency and increasing emissions. Similarly, gaseous fuel temperature and/or pilot fuel temperature can be monitored to assess a cold start condition. Comparatively speaking, the mass of air is greater compared to the mass of gaseous fuel and/or pilot fuel in the combustion chamber such that air has a greater effect on the temperature of the charge. Alternatively, engine oil temperature can be employed to determine cold start conditions. When the engine oil temperature is below a second temperature threshold then cold start conditions exist. The viscosity of engine oil increases as its temperature decreases. During cold start conditions due to engine oil viscosity it takes significantly more battery power to crank the engine and as a result the crank speed decreases as engine oil temperature decreases. Other temperatures can be employed to determine cold start conditions. Engine coolant temperature can be an indication of whether the engine has been recently running, thereby providing an indirect measure of engine oil temperature. When engine coolant temperature is below a third temperature threshold then cold start conditions exist. Generally speaking, engine oil temperature mostly varies with engine output, whereas engine coolant temperature varies with engine output, airflow and radiator capacity. As a result, engine oil temperature is largely unrelated to engine coolant temperature, except that when the oil temperature is warm it is likely that the coolant temperature is warm. Controller temperature can be employed to determine whether the engine was previously running, in which case controller temperature will be higher than ambient air temperature. Battery temperature can also be monitored to determine cold start conditions. When battery temperature is below a fourth temperature threshold then cold start conditions exist. Battery internal resistance increases as temperature decreases, which decreases output voltage and battery capacity, thereby reducing battery power available for cranking the engine. In very cold operating environments, for example, the electrolyte in lead acid batteries has the danger of freezing so external heat sources may be employed to heat the battery, reducing the effectiveness of battery temperature alone as an indication of cold start. Any one of ambient air temperature, air intake temperature, battery temperature, engine coolant temperature, engine oil temperature, gaseous fuel temperature and pilot fuel temperature can be employed to determine whether a cold start condition exists.

Figure 4:
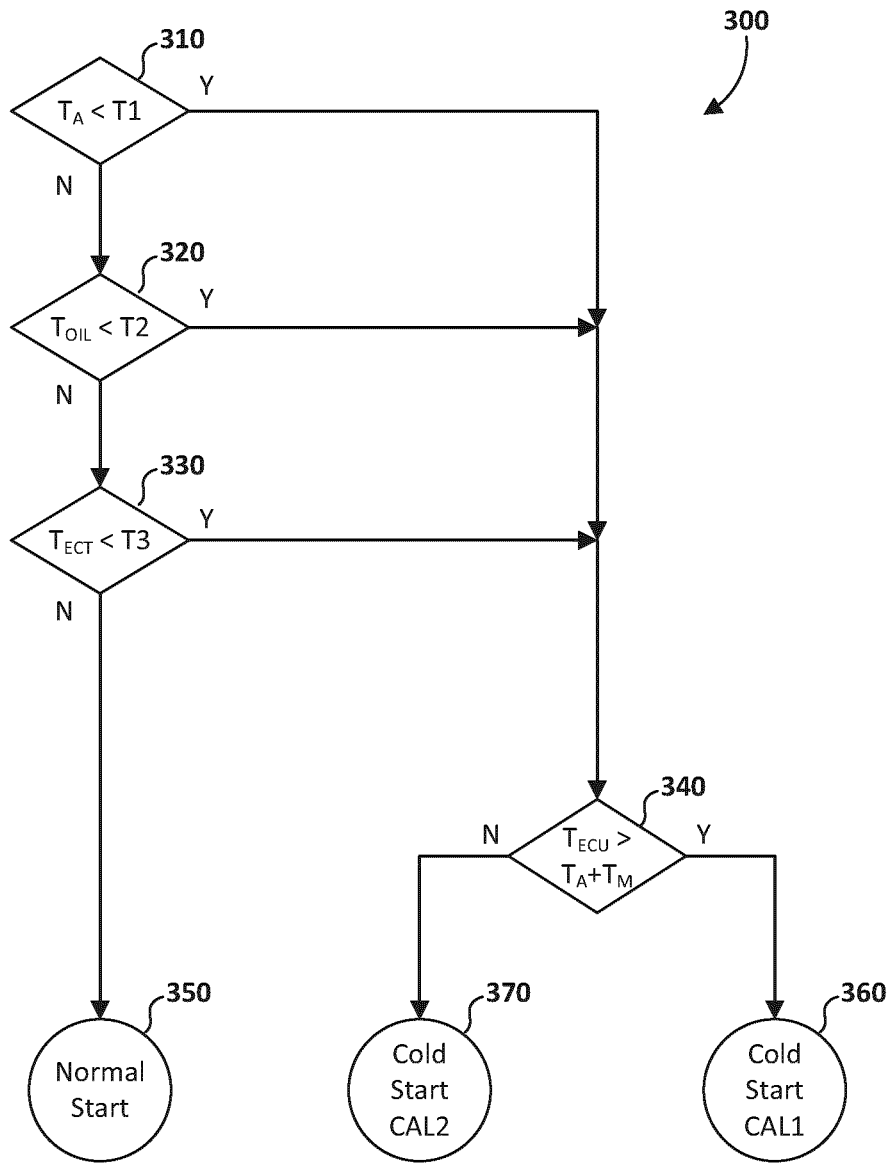
FIG. 4 is flow chart view of a cold start determination algorithm for determining one of cold start conditions and normal start conditions according to a first embodiment.

With reference to FIG. 4, a preferred embodiment for a cold start determination algorithm 300 is illustrated that employs ambient air temperature, engine oil temperature, engine coolant temperature and controller temperature in the cold start determination in step 240 (seen in FIG. 3). Algorithm 300 determines that a cold start conditions exists if any one of ambient air temperature, engine oil temperature and engine coolant temperature are below respective thresholds. In step 310, controller 100 determines whether ambient air temperature ($T_A$) is less than the first temperature threshold, and if it is then a start-up flag is set indicating that a cold start condition exists and control transfers to step 340, and if not then a possible normal start condition exists and control transfers to step 320. The start-up flag is stored by controller 100 and is employed to represent a number of start-up conditions as explained below. In step 320, controller 100 determines whether engine oil temperature ($T_{OIL}$) is less than the second temperature threshold, and if it is then the start-up flag is set indicating that a cold start condition exists and control transfers to step 340, and if not then a possible normal start condition exists and control transfers to step 330. In step 330, controller 100 determines whether engine coolant temperature ($T_{ECT}$) is less than the third temperature threshold, and if it is then the start-up flag is set indicating that a cold start condition exists and control transfers to step 340, and if not then the start-up flag is set indicating that a normal start condition exists and control transfers to step 350. When entering step 340, it has already been determined that a cold start condition exists. Different calibrations can be employed during cold start depending on whether the engine has been recently running or not. In step 340 controller 100 determines whether controller temperature ($T_{ECU}$) is greater than the sum of ambient air temperature and temperature margin $T_M$, and if it is a first cold start calibration (CAL1) is employed and the start-up flag is set accordingly in step 360, otherwise a second cold start calibration (CAL2) is employed and the start-up flag is set accordingly in step 370. The voltage applied to the fuel injectors is dependent on the controller temperature and battery temperature and different cold start calibrations are employed to compensate for cold fuel injector drivers. In other embodiments there can be two or more cold start calibrations selected as a function of controller temperature. Cold start determination algorithm 300 allows detection of cold start conditions with more accuracy such that, on the one hand, the likelihood of starting the engine is increased, and on the other it does not unnecessarily delay the starting of the engine while waiting for desired operating parameters. Each one of ambient air temperature, engine oil temperature and engine coolant temperature affect the cold start behavior of the engine.

Returning to FIG. 3, normal start algorithm 260, which is performed when the start-up flag indicates that normal start conditions exist, is now described. In step 270 controller 100 monitors pilot fuel pressure and waits until it is greater than a first predetermined pressure. While controller 100 is waiting for pilot fuel pressure to rise, the engine is cranking but no pilot fuel is injected into combustion chambers. After pilot fuel has reached the required pressure, controller 100 actuates fuel injectors 120[*a-b*] or 121[*a-b*] to inject pilot fuel into the combustion chambers in step 275. In addition to pilot fuel, controller 100 can selectively inject gaseous fuel into combustion chambers in step 280. By employing gaseous fuel as a fraction of total fuel introduced on an energy basis, emissions can be reduced and economic advantages can be obtained. Once the engine can turn the crank without the aid of the starter motor, as a result of combustion of pilot fuel and gaseous fuel (if employed), the starter motor can be disabled. This condition can be detected, for example, by the operator or automatically by an increase in engine speed.

Cold start algorithm 250, which is performed when the start-up flag indicates that cold start conditions exist, differs from normal start algorithm 260 in at least one way by injecting pilot fuel at a higher pressure compared to normal start. During cold start conditions controller 100 commands pumping apparatus 60 (in step 230) to provide the maximum flow rate of pilot fuel, which can comprise commanding the inlet metering valve to open fully such that pilot fuel pressure can be increased as quickly as possible and fuelling demand can be met without decreasing pilot fuel pressure. In step 285 controller 100 monitors pilot fuel pressure and waits until it is greater than a second predetermined pressure. The second predetermined pressure is greater than the first predetermined pressure such that during cold start there is a delay for injecting pilot fuel compared to normal start, because during cold start the pilot fuel pressure is increased to a higher threshold. Crank rotational speed is slower during cold start compared to normal start conditions, due to increased engine oil viscosity and reduced battery power available for the starter motor. As a result pumping apparatus 60 takes longer to pressurize pilot fuel during cold start. Pilot fuel pressure will decrease below the required injection pressure if pilot fuel is injected before pilot fuel pressure reaches the second predetermined pressure since pumping apparatus 60 cannot meet fuelling demand during cold start conditions. When pilot fuel is introduced at less than the required injection pressure a consequence can be that not enough pilot fuel is introduced into the combustion chamber such that subsequent combustion does not contribute sufficiently to starting the engine, causing the cranking period to be extended. In the worst case the engine will not start. While controller 100 is waiting for pilot fuel pressure to rise in step 285, the engine is cranking but no pilot fuel is injected into combustion chambers. After pilot fuel has reached the second predetermined pressure, controller 100 actuates fuel injectors 120[*a-b*] or 121[*a-b*] to inject pilot fuel into the combustion chambers in step 290. Pilot fuel pressure typically starts to rise slowly on cold start, and then after a while begins to rise very quickly towards the second predetermined pressure. It is possible to detect this rapid increase in pilot fuel pressure and begin to inject pilot fuel after a predetermined amount of time after the detection such that pilot fuel pressure is at a suitable level for injection during cold start conditions. In addition to pilot fuel, controller 100 can selectively inject gaseous fuel into combustion chambers in step 295.

Start of injection timing (SOI) for pilot fuel is advanced during cold start such that start of combustion (SOC) timing is advanced leading to increased in-cylinder peak combustion pressure, which increases the motive force to reciprocate the pistons improving the ability of the engine to start. SOI timing can be determined as a function of any one of the temperatures employed to detect cold start previously mentioned. Fuelling command is increased during cold start conditions such that more fuel (pilot fuel and possibly gaseous fuel) is injected into the combustion chambers to increase the in-cylinder peak combustion pressure. SOI timing is also advanced such that the mid-point of the integrated heat release occurs within in a predetermined range, which in a preferred embodiment is between 0 degrees after top dead center (ATDC) and 15 degrees ATDC. Once the engine has started (for example when a characteristic increase in engine speed is detected) the starter motor can be disabled. It is not necessary to inject gaseous fuel during cold start. When the gaseous fuel is LNG, it is possible that the gaseous fuel temperature downstream from gaseous fuel supply 20 is less than ambient temperature, which can reduce the ignitability of fuel inside the combustion chambers. When gaseous fuel pressure on start-up is low, a cryogenic pump is required to pressurize gaseous fuel. Operating the cryogenic pump on start-up may require too much energy or more energy than is available while starting the engine. It has been found that it is more advantageous to only introduce pilot fuel, which characteristically is more compression ignition ignitable than gaseous fuel.

Figure 5:
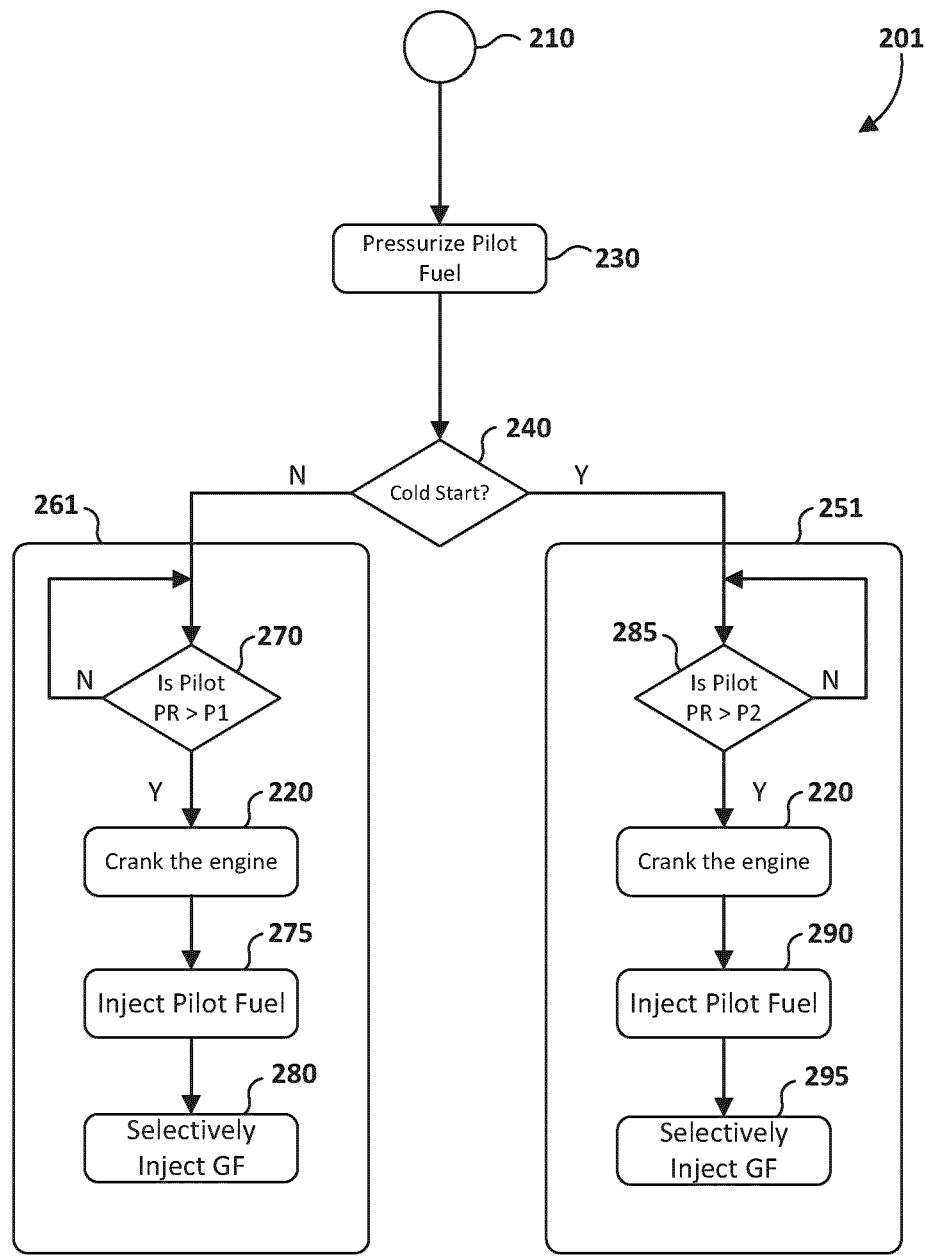
FIG. 5 is flow chart view of a start-up algorithm for the internal combustion engines of FIGS. 1 and 2 according to a second embodiment.

Referring now to FIG. 5, start-up algorithm 201 is illustrated according to a second embodiment similar to the first embodiment in FIG. 3 where like steps have like reference numerals and may not be described in detail if at all. Start-up algorithm 201 is programmed in and performed by controller 100 when starting an engine where pumping apparatus 60 is not driven by a power take-off of the engine. In a preferred embodiment pumping apparatus 60 is electrically driven. As a result, when a start command is received in step 210, controller 100 commands pumping apparatus 60 to pressurize pilot fuel in step 230 without commanding the starter motor to turn the crank since the pumping apparatus is not driven as a result of the crank rotating. In normal start algorithm 261, controller 100 commands the starter motor to turn the crank in step 220 after it is determined that pilot fuel pressure is greater than the first predetermined pressure in step 270. As the crank is rotating and the pistons within the combustion chambers are reciprocating controller 100 actuates fuel injectors 120[*a-b*] or 121[*a-b*] in step 275 to inject pilot fuel and in step 280 to selectively inject gaseous fuel. Similarly, in cold start algorithm 251 controller 100 commands the starter motor to turn the crank in step 220 after it is determined that pilot fuel pressure is greater than the second predetermined pressure in step 285 and before actuating fuel injectors 120[*a-b*] or 121[*a-b*] in step 290 to introduce pilot fuel. In addition to pilot fuel, controller 100 can selectively inject gaseous fuel into combustion chambers in step 295.

The techniques in this disclosure extend the cold ambient temperature range in which internal combustion engines fuelled with a gaseous fuel and a pilot fuel can start. A cold start determination algorithm was presented that allows detection of cold start conditions with more accuracy such that, on the one hand, the likelihood of starting the engine is increased, and on the other it does not unnecessarily delay the starting of the engine while waiting for desired operating parameters.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for starting a compression ignition gaseous fueled internal combustion engine employing a liquid pilot fuel comprising:
    determining a start condition chosen from one of a normal start condition and a cold start condition:

during said normal start condition and while cranking said internal combustion engine, introducing said liquid pilot fuel into a combustion chamber of said gaseous fueled internal combustion engine when said liquid pilot fuel pressure rises above a first pressure;

during said cold start condition and while cranking said internal combustion engine, delaying introduction of said liquid pilot fuel, while cranking, as compared to said normal start condition and introducing said liquid pilot fuel into said combustion chamber when said liquid pilot fuel pressure rises above a second pressure that is higher than said first pressure, wherein said second pressure is selected such that a liquid pilot fuel injection pressure at which said liquid pilot fuel is introduced into said combustion chamber of said gaseous fueled internal combustion engine is maintained above a predetermined injection pressure when introducing said liquid pilot fuel during said cold start condition, thereby introducing an amount of said liquid pilot fuel increasing a probability to start said gaseous fueled internal combustion engine at said cold start condition; and selectively introducing said gaseous fuel into said combustion chamber.

2. The method of claim 1, further comprising cranking said internal combustion engine to pressurize said liquid pilot fuel.

3. The method of claim 1, further comprising timing cranking of said internal combustion engine after liquid pilot fuel pressure rises above (a) said first pressure during said normal start condition and (b) said second pressure during said cold start condition.

4. The method of claim 1, wherein said cold start condition exists when at least one of said ambient air temperature, air intake temperature, battery temperature, controller temperature, engine coolant temperature, engine oil temperature, gaseous fuel temperature and liquid pilot fuel temperature is below a respective temperature threshold.

5. The method of claim 4, wherein said second pressure is a function of said respective temperature threshold.

6. The method of claim 4, further comprising:
monitoring one of controller temperature and battery temperature;
employing a first cold start calibration when one of said controller temperature and battery temperature is greater than said ambient air temperature by a predetermined margin; and
employing a second cold start calibration when one of said controller temperature and battery temperature is less than a sum of said ambient air temperature and said predetermined margin.

7. The method of claim 1, further comprising determining when a rate of liquid pilot fuel pressure increase rises above a predetermined value; and waiting a predetermined amount of time after said rate of liquid pilot fuel pressure increases above said predetermined value before introducing said liquid pilot fuel such that said liquid pilot fuel rises above said second pressure.

8. The method of claim 1, wherein when said cold start condition exists and while introducing said liquid pilot fuel further comprising advancing start of injection timing of said liquid pilot fuel during a compression stroke compared to start of injection timing of said liquid pilot fuel during said normal start condition.

9. The method of claim 8, wherein start of injection timing is determined as at least one of a function of at least one of said ambient air temperature, air intake temperature, battery temperature, controller temperature, engine coolant temperature, engine oil temperature, gaseous fuel temperature and liquid pilot fuel temperature and a function of liquid pilot fuel injection quantity.

10. The method of claim 1, wherein when said cold start condition exists, further comprising increasing liquid pilot fuel injection quantity compared to liquid pilot fuel injection quantity during said normal start condition.

11. The method of claim 10, wherein liquid pilot fuel injection quantity is determined as a function of at least one of said ambient air temperature, air intake temperature, battery temperature, controller temperature, engine coolant temperature, engine oil temperature, gaseous fuel temperature and liquid pilot fuel temperature.

12. The method of claim 1, wherein said gaseous fuel is at least one of biogas, dimethyl ether, ethane, hydrogen, landfill gas, liquefied natural gas, liquefied propane gas, methane, natural gas and propane.

13. An internal combustion engine fueled with a gaseous fuel and a pilot fuel comprising:
a gaseous fuel supply;
a liquid pilot fuel supply;
a pumping apparatus for pressurizing liquid pilot fuel received from the liquid pilot fuel supply;
a fuel injector in fluid communication with said pumping apparatus and configured to directly introduce liquid pilot fuel into a combustion chamber of said internal combustion engine fueled with a gaseous fuel and a liquid pilot fuel; and
a controller operatively connected with said pumping apparatus and said fuel injector and programmed to:
command said pumping apparatus to pressurize said liquid pilot fuel when starting said internal combustion engine;
determine a start condition chosen from one of a normal start condition and a cold start condition:
during said normal start condition and while cranking said internal combustion engine, command said fuel injector to introduce said liquid pilot fuel into said combustion chamber when said liquid pilot fuel pressure rises above a first pressure; and
during said cold start condition and while cranking said internal combustion engine, delay injection of said liquid pilot fuel, while cranking, as compared to said normal start condition and command said fuel injector to introduce said liquid pilot fuel into said combustion chamber when said liquid pilot fuel pressure rises above a second pressure that is higher than said first pressure, wherein said second pressure is selected such that a liquid pilot fuel injection pressure at which said liquid pilot fuel is introduced into said combustion chamber of said gaseous fueled internal combustion engine is maintained above a predetermined injection pressure when introducing said liquid pilot fuel during said cold start condition, thereby introducing an amount of said liquid pilot fuel increasing a probability to start said gaseous fueled internal combustion engine at said cold start condition.

14. The internal combustion engine of claim 13, further comprising a starter motor, said controller is further programmed to command said starter motor to crank said internal combustion engine such that said pumping apparatus pressurizes said liquid pilot fuel as a result of said cranking.

15. The internal combustion engine of claim 13, further comprising a starter motor, said controller is further programmed to command said starter motor to crank when said liquid pilot fuel pressure rises above (a) said first pressure during said normal start condition and (b) said second pressure during said cold start condition.

16. The internal combustion engine of claim 13, wherein said cold start condition exists when at least one of said ambient air temperature, air intake temperature, battery temperature, controller temperature, engine coolant temperature, engine oil temperature, gaseous fuel temperature and liquid pilot fuel temperature is below a first temperature threshold.

17. The internal combustion engine of claim 13, wherein said fuel injector is in fluid communication with said gaseous fuel supply and configured to directly introduce gaseous fuel into said combustion chamber and said controller is further programmed to selectively command said fuel injector to introduce said gaseous fuel.

18. The internal combustion engine of claim 13, further comprising a gaseous fuel injector in fluid communication with said gaseous fuel supply and configured to directly introduce gaseous fuel into said combustion chamber, wherein said controller is further programmed to selectively command said gaseous fuel injector to introduce said gaseous fuel.

19. The internal combustion engine of claim 13, further comprising a shut-off valve downstream of said gaseous fuel supply, wherein said controller is further programmed to command said shut-off valve to fluidly disconnect said gaseous fuel supply from said combustion chamber during said cold start condition.

20. The internal combustion engine of claim 19, further comprising a pressure regulating apparatus in fluid communication with said gaseous fuel supply for regulating gaseous fuel pressure based on liquid pilot fuel pressure and supplying said fuel injector with said gaseous fuel.

21. The method of claim 1, wherein the introducing said liquid pilot fuel into said combustion chamber when said liquid pilot fuel pressure rises above a second pressure that is higher than said first pressure further comprises injecting said liquid pilot fuel into said combustion chamber at or above a predetermined liquid pilot fuel injection pressure, wherein said cold start condition occurs when an ambient air temperature is at or below a temperature threshold at which engine oil viscosity increases sufficiently that crank rotational speed of said internal combustion engine during starting is unable to cause a pilot fuel pump which is driven by said internal combustion engine to maintain said predetermined liquid pilot fuel injection pressure while injecting liquid pilot fuel during starting.

22. The internal combustion engine of claim 13, wherein during the cold start condition, the command said fuel injector to introduce said liquid pilot fuel into said combustion chamber when said liquid pilot fuel pressure rises above a second pressure that is higher than said first pressure results in injection of said liquid pilot fuel into said combustion chamber at or above a predetermined liquid pilot fuel injection pressure and wherein said cold start condition occurs when an ambient air temperature is at or below a temperature threshold at which engine oil viscosity increases sufficiently that crank rotational speed of said internal combustion engine during starting is unable to cause a pilot fuel pump which is driven by said internal combustion engine to maintain said predetermined liquid pilot fuel injection pressure while injecting liquid pilot fuel during starting.

23. The method of claim 1, wherein during said cold start condition further includes maintaining said liquid pilot fuel pressure above an injection pressure during starting.

24. The internal combustion engine of claim 13, wherein during said cold start condition further includes maintaining said liquid pilot fuel pressure above an injection pressure during starting.

\* \* \* \* \*